(12) United States Patent
Shin

(10) Patent No.: US 10,852,862 B2
(45) Date of Patent: Dec. 1, 2020

(54) INTEGRATED SWITCH DEVICE FOR VEHICLE AND OPERATING METHOD THEREOF

(71) Applicants: HYUNDAI MOTOR COMPANY, Seoul (KR); KIA MOTORS CORPORATION, Seoul (KR)

(72) Inventor: Sang Hoon Shin, Hwaseong-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 26 days.

(21) Appl. No.: 16/172,906

(22) Filed: Oct. 29, 2018

(65) Prior Publication Data

US 2020/0026370 A1    Jan. 23, 2020

(30) Foreign Application Priority Data

Jul. 19, 2018 (KR) ........................ 10-2018-0084070

(51) Int. Cl.

| G06F 3/041 | (2006.01) |
|---|---|
| B60R 1/072 | (2006.01) |
| B60K 35/00 | (2006.01) |
| G06F 21/32 | (2013.01) |
| H03K 17/96 | (2006.01) |
| G06F 3/01 | (2006.01) |
| H03K 17/965 | (2006.01) |

(52) U.S. Cl.
CPC .............. *G06F 3/041* (2013.01); *B60K 35/00* (2013.01); *B60R 1/072* (2013.01); *G06F 3/016* (2013.01); *G06F 21/32* (2013.01); *H03K 17/96* (2013.01); *H03K 17/965* (2013.01); *B60K 2370/1438* (2019.05); *B60K 2370/1446* (2019.05)

(58) Field of Classification Search
CPC ............ B60K 35/00; B60K 2370/1446; B60K 2370/1438; B60R 1/072; G06F 3/016; G06F 21/32; H03K 17/96; H03K 17/965
USPC ......................................................... 340/644
See application file for complete search history.

(56) References Cited

U.S. PATENT DOCUMENTS

| 6,100,811 A | 8/2000 | Hsu et al. |
|---|---|---|
| 6,429,542 B1 | 8/2002 | Furuya et al. |

(Continued)

FOREIGN PATENT DOCUMENTS

| JP | H11-096853 A | 4/1999 |
|---|---|---|
| KR | 10-2014-0047989 A | 4/2014 |

(Continued)

*Primary Examiner* — Jack K Wang
(74) *Attorney, Agent, or Firm* — Morgan, Lewis & Bockius LLP

(57) ABSTRACT

An integrated switch device for a vehicle includes: an input device configured to receive a user's fingerprint; a touch device configured to generate a mirror angle adjustment signal; a touch display configured to display a door control interface, a mirror selection interface, a mirror control interface, and a seat setting interface; and a controller configured to determine an operation mode based on whether the vehicle in a driving mode, a power condition, and whether a door is open and to set an interface displayed on the touch display among the door control interface, the mirror selection interface, the mirror control interface, and the seat setting interface depending on the operation mode.

19 Claims, 11 Drawing Sheets

MODE_5

(56) References Cited

U.S. PATENT DOCUMENTS

| | | | |
|---|---|---|---|
| 9,002,536 B2* | 4/2015 | Hatton | H04L 63/0853 |
| | | | 701/2 |
| 2011/0102164 A1* | 5/2011 | Ghabra | B60R 25/04 |
| | | | 340/426.13 |
| 2013/0099892 A1* | 4/2013 | Tucker | B60R 25/241 |
| | | | 340/5.61 |
| 2013/0259232 A1* | 10/2013 | Petel | G07C 9/00857 |
| | | | 380/270 |
| 2015/0120151 A1 | 4/2015 | Akay et al. | |
| 2017/0268278 A1* | 9/2017 | Ichinose | E05F 15/611 |
| 2018/0154774 A1* | 6/2018 | Park | B60K 35/00 |
| 2019/0095227 A1* | 3/2019 | Hwang | G06K 9/00087 |
| 2019/0143953 A1* | 5/2019 | Jang | B60K 6/485 |
| | | | 180/65.285 |
| 2019/0279009 A1* | 9/2019 | Srirangam Narashiman | |
| | | | G06K 9/2018 |

FOREIGN PATENT DOCUMENTS

| | | |
|---|---|---|
| KR | 10-2016-0107152 A | 9/2016 |
| KR | 10-1795274 B1 | 11/2017 |

* cited by examiner

WHEN SELECTING LH

WHEN SELECTING RH

WHEN SELECTING LH

WHEN SELECTING RH

INTEGRATED SWITCH DEVICE FOR VEHICLE AND OPERATING METHOD THEREOF

CROSS-REFERENCE TO RELATED APPLICATION

This application is based on and claims the benefit of priority to Korean Patent Application No. 10-2018-0084070, filed on Jul. 19, 2018, in the Korean Intellectual Property Office, the disclosure of which is incorporated herein in its entirety by reference.

TECHNICAL FIELD

The present disclosure relates to an integrated switch device for a vehicle and an operation method thereof, and more particularly, to a switch device that provides integrated functions of a door lock/unlock switch, a power mirror angle adjustment switch, a mirror folding switch, an integrated memory system (IMS) switch, and an engine start/stop button.

BACKGROUND

Various convenience devices for a vehicle, such as, a door lock/unlock switch that simultaneously locks/unlocks all doors in the vehicle, a power mirror angle adjustment switch that allows a driver to adjust the angle of the mirror to fit the driver, a power mirror folding switch that allows the driver to fold side mirrors, an integrated memory system (IMS) switch that has records about a height and a position of a driver's seat and an angle of driver's backrest suitable for the driver, and an engine start/stop button that allows the driver to start/stop the engine of the vehicle, are installed on a driver's door armrest in the vehicle recently released.

The door lock/unlock switch, the power mirror angle adjustment switch, the power mirror folding switch, the IMS switch, and the engine start/stop button are components of systems that are respectively designed from each other. Thus, for the driver, it is difficult to operate all the switches since the number of the switches are too large to handle, and since manufacturers are required to manufacture each switch individually, an issue related to increase in the price of the vehicle arises.

SUMMARY

The present disclosure has been made to solve the above-mentioned problems occurring in the prior art while advantages achieved by the prior art are maintained intact.

An aspect of the present disclosure provides an integrated switch device for a vehicle and an operation method thereof, which is capable of providing a driver with operational convenience by assembling one input button, one touch button, and one touch screen and providing a function of each of a door lock/unlock switch, a power mirror angle adjustment switch, a mirror folding switch, an integrated memory system (IMS) switch, and an engine start/stop button.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an integrated switch device for a vehicle includes: an input device receiving a user's fingerprint; a touch device generating a mirror angle adjustment signal; a touch display displaying a door control interface, a mirror selection interface, a mirror control interface, and a seat setting interface; and a controller determining an operation mode based on whether the vehicle is in a driving mode, a power condition, and whether a door is opened and setting an interface displayed on the touch display among the door control interface, the mirror selection interface, the mirror control interface, and the seat setting interface depending on the operation mode.

The input device is implemented by one of a push-return type physical button and a touch button with a vibration reaction.

The controller activates a user's fingerprint input mode, a door lock/unlock input mode, and a mirror folding input mode as a first mode.

The controller activates a mirror selection mode, a mirror angle input mode, and the mirror folding input mode as a second mode.

The controller switches the first mode to the second mode when a swipe is input from a right side to a left side in the first mode and switches the second mode to the first mode when the swipe is input from the left side to the right side in the second mode.

The controller activates an integrated memory system (IMS) setting mode and a driver selection mode as a third mode.

The controller switches the second mode to the third mode when a swipe is input from a right side to a left side in the second mode and switches the third mode to the second mode when the swipe is input from the left side to the right side in the third mode.

The controller controls the input device such that the input device serves as a start button, controls the touch display such that one of a symbol (OFF) indicating a state in which a power is not supplied to vehicle's electrical loads, a symbol (ACC) indicating a state in which the power is supplied to some of the vehicle's electrical loads, and a symbol (ON) indicating a state in which the power is supplied to all the vehicle's electrical loads, and activates engine start/stop input mode and a power state display mode as a fourth mode.

The controller switches the first mode to the fourth mode when the swipe is input from a bottom side to a top side in the first mode and switches the fourth mode to the first mode when the swipe is input from the top side to the bottom side in the fourth mode.

The controller switches the first mode to the fourth mode when a fingerprint is authenticated in the first mode and switches the fourth mode to the first mode when the swipe is input from the top side to the bottom side in the fourth mode.

The controller switches the first mode to the fourth mode when the swipe is input from the bottom side to the top side in the first mode and switches the fourth mode to the first mode when a reference time elapses in the fourth mode.

The controller switches the first mode to the fourth mode when a fingerprint is authenticated in the first mode and switches the fourth mode to the first mode when a reference time elapses in the fourth mode.

The controller switches the second mode to the fourth mode when the swipe is input from the bottom side to the top side in the second mode and switches the fourth mode to the second mode when the swipe is input from the top side to the bottom side in the fourth mode.

The controller switches the second mode to the fourth mode when the swipe is input from the bottom side to the top side in the second mode and switches the fourth mode to the second mode when a reference time elapses in the fourth mode.

The controller activates a fifth mode in which a fingerprint registration progress is displayed through the touch display in a bar shape and a percent.

The controller switches the fourth mode to the fifth mode when the swipe is input from the right side to the left side in the fourth mode and switches the fifth mode to the fourth mode when the swipe is input from the left side to the right side in the fifth mode.

The controller switches the fourth mode to the fifth mode when the swipe is input from the right side to the left side in the fourth mode and switches the fifth mode to the fourth mode when a fingerprint registration is completed in the fifth mode.

According to another aspect of the present disclosure, a method for operating an integrated switch device, which comprises an input device, a touch device, a touch display, and a controller, for a vehicle, includes: setting, by the controller, a user's fingerprint input mode, a door lock/unlock input mode, and a mirror folding input mode to a first mode, setting a mirror selection mode, a mirror angle input mode, and the mirror folding input mode to a second mode; setting, by the controller, an integrated memory system (IMS) setting mode and a driver selection mode to a third mode; setting, by the controller, an engine start/stop input mode and a power state display mode to a fourth mode; setting, by the controller, a mode in which a fingerprint registration progress is displayed in a bar shape and a percent to a fifth mode; and transiting, by the controller, a state between the first mode, the second mode, the third mode, the fourth mode, and the fifth mode depending on a user's operation.

The transiting of the state includes: switching the first mode to the second mode when a swipe is input from a right side to a left side in the first mode; switching the second mode to the first mode when the swipe is input from the left side to the right side in the second mode; switching the second mode to the third mode when the swipe is input from the right side to the left side in the second mode; switching the third mode to the second mode when the swipe is input from the left side to the right side in the third mode; switching the third mode to the fourth mode when the swipe is input from a bottom side to a top side; switching the first mode to the fourth mode when the swipe is input from the bottom side to the top side in the first mode; switching the fourth mode to the first mode when the swipe is input from the top side to the bottom side in the fourth mode, switching the second mode to the fourth mode when the swipe is input from the bottom side to the top side in the second mode; switching the fourth mode to the second mode when a reference time elapses in the fourth mode; switching the fourth mode to the fifth mode when the swipe is input from the right side to the left side in the fourth mode; and switching the fifth mode to the fourth mode when a fingerprint registration is completed in the fifth mode.

The transiting of the state includes switching the first mode to the fourth mode when a fingerprint is authenticated in the first mode and switching the fourth mode to the first mode when the swipe is input from the top side to the bottom side in the fourth mode.

The transiting of the state includes switching the first mode to the fourth mode when the swipe is input from the top side to the bottom side in the first mode and switching the fourth mode to the first mode when a reference time elapses in the fourth mode.

The transiting of the state includes switching the first mode to the fourth mode when a fingerprint is authenticated in the first mode and switching the fourth mode to the first mode when a reference time elapses in the fourth mode.

According to the above, the integrated switch device and the operation method thereof provide the driver with the operational convenience by assembling one input button, one touch button, and one touch screen and providing the function of each of the door lock/unlock switch, the power mirror angle adjustment switch, the power mirror folding switch, the integrated memory system (IMS) switch, and the engine start/stop button.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
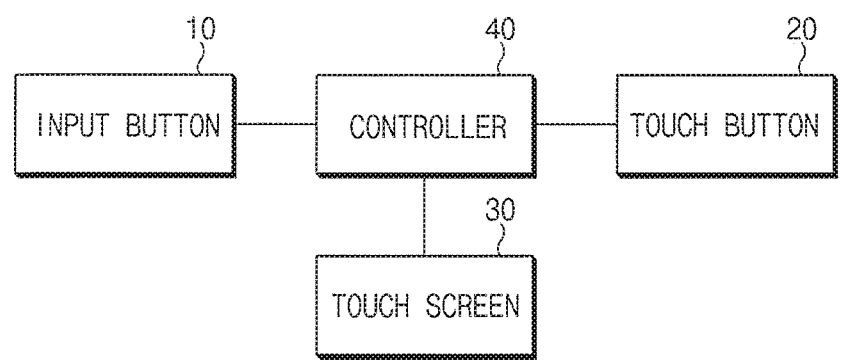
FIG. 1 is a block diagram showing an integrated switch device for a vehicle according to an exemplary embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram showing an integrated switch device for a vehicle according to an exemplary embodiment of the present disclosure.

Referring to FIG. 1, the integrated switch device for the vehicle according to the present disclosure may include an input button 10, a touch button 20, a touch screen 30, and a controller 40. According to embodiments, components may be combined with each other in one device, and one or more components may be omitted depending on the manner in which the invention is carried out.

Figure 2:
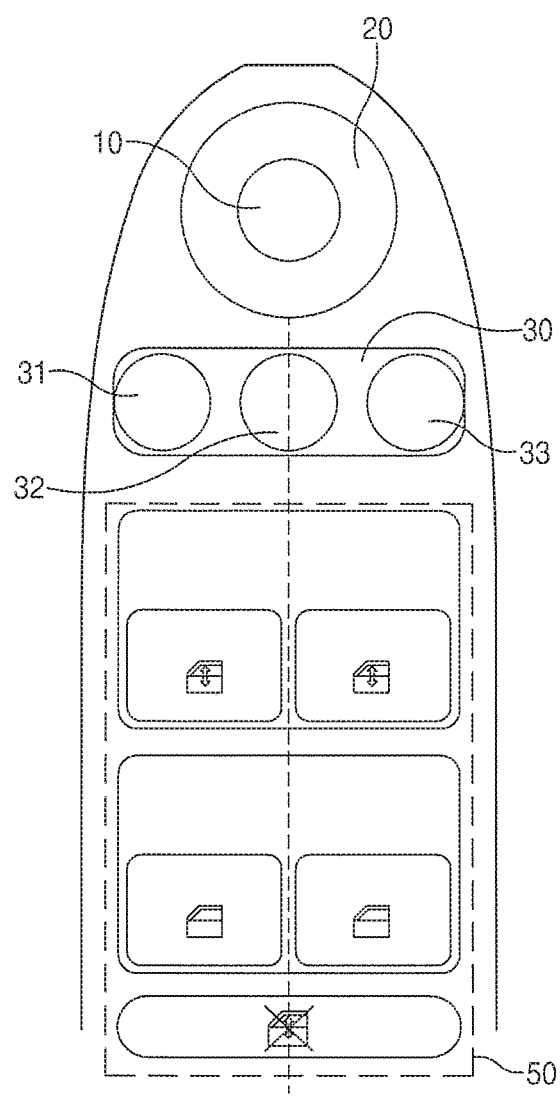
FIG. 2 is a view showing a structure of an integrated switch device for a vehicle according to an exemplary embodiment of the present disclosure.

The input button 10 may correspond to an input device of which a surface is formed of a transparent material, e.g., a glass or a plastic, and may receive a fingerprint of a user when a user's finger makes contact therewith. The input button 10 may be implemented in various shapes, such as a quadrangular shape, a polygonal shape, or a circular shape, however, the circular shape is most preferred among the various shapes as shown in FIG. 2.

In addition, the input button 10 may operate as a start button of the vehicle. In this case, the controller 40 may decide to display or may not to display a message "ENGINE START/STOP" on the surface of the input button 10. In addition, the input button 10 may receive a user's operation. As described above, when the input button 10 operates as the start button, the input button 10 may have the same function as the start button.

Further, the input button 10 may be implemented by a push-return type physical button or by a touch button that has a vibration reaction (haptic) function and senses a pressure.

The touch button 20 may correspond to a touch device to adjust an angle of a side mirror. When a mirror adjustment mode is activated, a symbol (arrows or directions pointing up, down, left, and right) appears on a surface of the touch button 20 as the touch button 20 is illuminated. The touch button 20 may also have the haptic function.

In addition, the touch button 20 may be implemented in the circular shape as shown in FIG. 2. As an example, the touch button 20 may be implemented in a shape surrounding the input button 10.

The touch screen 30 is a touch display having a touch panel, displays a symbol (e.g., an input interface) corresponding to each mode, and generates a signal corresponding to the symbol.

For example, the touch screen 30 displays a door unlock symbol, a mirror folding symbol, and a door lock symbol when the touch screen 30 operates in a first mode, the touch screen 30 displays a left mirror selection symbol, the mirror folding symbol, and a right mirror selection symbol when the touch screen 30 operates in a second mode, the touch screen 30 displays an IMS setting symbol, a first driver selection symbol, and a second driver selection symbol when the touch screen 30 operates in a third mode, the touch screen 30 displays one of a symbol (OFF) indicating a state in which a power is not supplied to vehicle's electrical loads, a symbol (ACC) indicating a state in which the power is supplied to some of the vehicle's electrical loads, and a symbol (ON) indicating a state in which the power is supplied to all the vehicle's electrical loads when the touch screen 30 operates in a fourth mode, and the touch screen 30 displays a fingerprint registration progress as a bar shape and a percent (%) when the touch screen 30 operates in a fifth mode. In this case, when the touch screen 30 operates in the fourth mode and the vehicle is starting up, the touch screen 30 displays the symbol (ON) in a different color to distinguish a state in which the power is supplied to all the vehicle's electrical loads while the vehicle is starting up from a state in which the power is supplied to all the vehicle's electrical loads while the vehicle is not starting up. In addition, when the mirror folding symbol is selected by the user, the touch screen 30 may display a mirror unfolding symbol. In the present exemplary embodiment, the symbols of "OFF", "ACC", "ON", the bar, and the percent (%) do not serve as input interfaces but serve as symbols indicating various states.

The touch screen 30 may include, for example, three display areas 31, 32, and 33 as shown in FIG. 2. In this case, when the touch screen 30 operates in the fifth mode, the fingerprint registration progress is displayed in the bar and percent (%) through one area regardless of the display areas. In FIG. 2, the touch screen 30 is located below the touch button 20, however, according to embodiments, the touch button 20 may be located below the touch screen 30.

For example, the door unlock symbol, the left mirror selection symbol, the IMS setting symbol, and the "OFF" symbol may be displayed through a first display area 31, the mirror folding symbol, the mirror unfolding symbol, the first driver selection symbol, and the "ACC" symbol may be displayed through a second display area 32, and the door lock symbol, the right mirror selection symbol, the second driver selection symbol, and the "ON" symbol may be displayed through a third display area 33.

In FIG. 2, the reference numeral "50" denotes a power window control switch, and the integrated switch device for the vehicle according to the present disclosure may be implemented with the power window control switch 50.

Consequently, the touch screen 30 displays a door control interface, a mirror selection interface, a mirror control interface, and a seat setting interface.

The controller 40 performs overall control so that each component may normally perform its function. The controller 40 may be implemented in a hardware, a software, or a combination of the hardware and the software. The controller 40 may be implemented by a microprocessor, but it should not be limited to the microprocessor. More specifically, the controller 40 may be an electronic control unit (ECU).

The controller 40 may determine the operation mode based on whether the vehicle travels, a power condition, and whether the door is opened and may set the interface displayed through the touch screen 30 among the door control interface, the mirror selection interface, the mirror control interface, and the seat setting interface depending on the operation mode. In this case, the controller 40 may collect information through a vehicle network or various sensors.

That is, the controller 40 may activate a user's fingerprint input mode, a door lock/unlock input mode and a mirror folding input mode as a first mode, may activate a mirror selection mode, a mirror angle input mode, and the mirror folding input mode as a second mode, may activate an IMS setting mode as a third mode, may activate a fourth mode that operates the input button 10 as the start button and displays the symbol indicating the state in which the power is supplied to the vehicle electrical loads, and may activate a fifth mode that operates the input button 10 as the user's fingerprint input mode and displays the fingerprint registration progress of the user in the bar shape and the percent (%).

In addition, the controller 40 may activate the first mode and the second mode as shown in Table 1 below.

TABLE 1

| From | | To | | | | | | |
|---|---|---|---|---|---|---|---|---|
| | Parking | Door open | Door close | OFF | ACC | ON | Starting | Driving |
| Parking | | MODE_1 | | | MODE_2 | X | MODE_2 | X |
| Door Open | | | | | | MODE_1 | | |
| Door Close | | | | | | MODE_2 | | |
| OFF | | | | | MODE_2 | | | X |
| ACC | | MODE_2 | | X | | | | X |
| ON | | | | MODE_1 | X | | MODE_2 | MODE_2 | X |
| Starting | | | | MODE_2 | X | MODE_2 | MODE_2 | |
| Driving | X | MODE_2 | MODE_2 | | MODE_2 | X | MODE_2 | MODE_2 |

In Table 1, a vertical axis indicates a previous state of the vehicle, and a horizontal axis indicates a present state of the vehicle, and "X" indicates a state in which the mode is not activated.

For instance, when the vertical axis indicates the "parking" state and the horizontal axis indicates "ACC" state, the second mode is activated, and when the vertical axis indicates the "door opening" state and the horizontal axis indicates "ACC" state, the first mode is activated.

Hereinafter, the operation of the controller 40 will be described in detail with reference to FIGS. 3A to 3E.

Figure 3A:
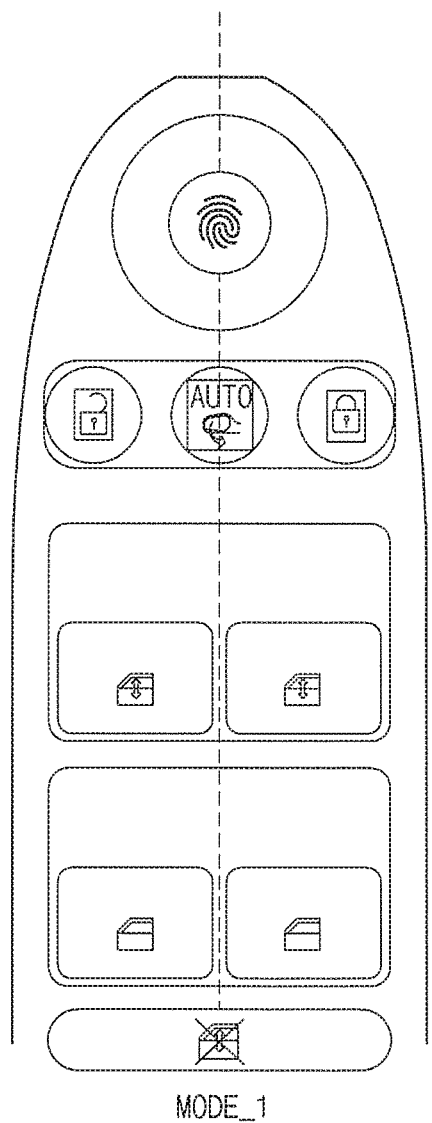
FIGS. 3A to 3E are views showing operation modes of an integrated switch device for a vehicle according to an exemplary embodiment of the present disclosure.

FIG. 3A is a view showing the first mode of the integrated switch device for the vehicle according to an exemplary embodiment of the present disclosure. The controller 40 controls the input button 10 to operate the fingerprint input mode, inactivates the touch button 20, and controls the touch screen 30 to display the door unlock symbol, the mirror folding symbol, and the door lock symbol.

Figure 3B:
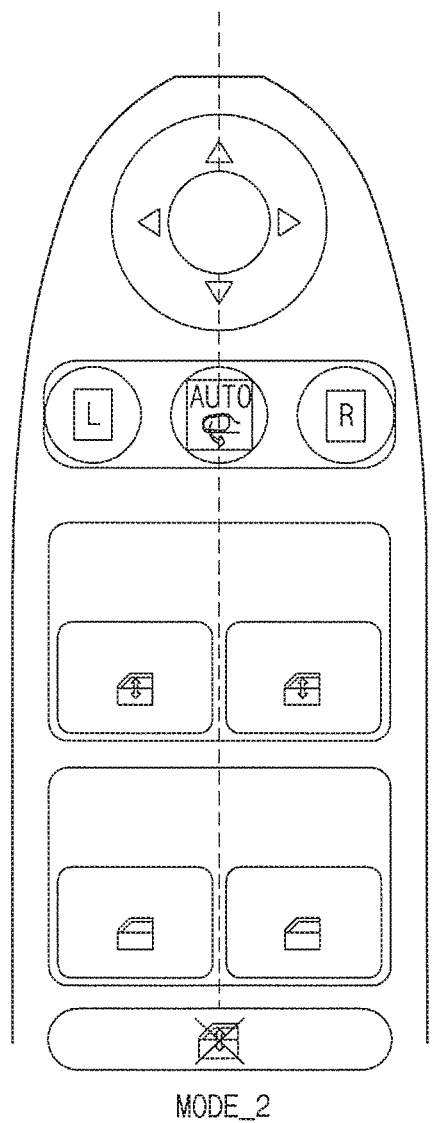

FIG. 3B is a view showing the second mode of the integrated switch device for the vehicle according to an exemplary embodiment of the present disclosure. The controller 40 inactivates the input button 10, controls the touch button 20 to activate the up/down/left/right directions for adjusting the angle of the mirror, and controls the touch screen 30 to display the left mirror selection symbol, the mirror folding symbol, and the right mirror selection symbol.

Figure 3C:
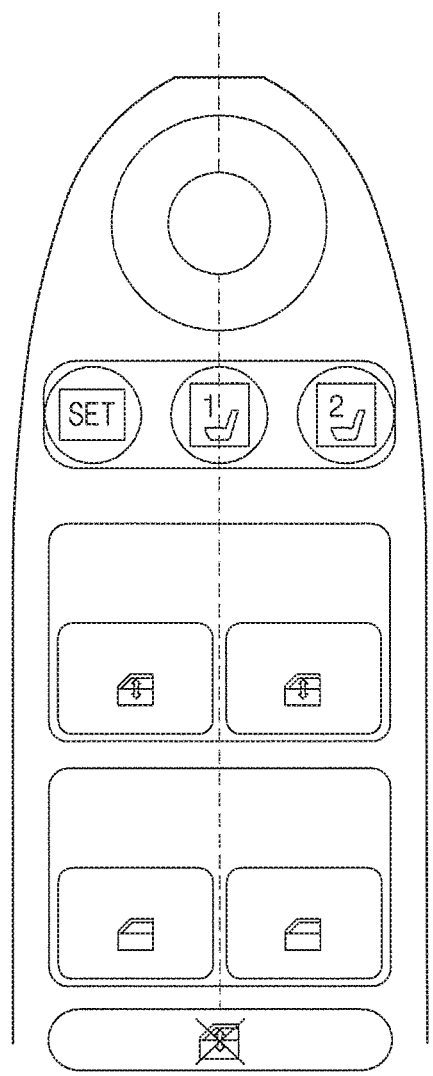

FIG. 3C is a view showing the third mode of the integrated switch device for the vehicle according to an exemplary embodiment of the present disclosure. The controller 40 inactivates the input button 10 and the touch button 20 and controls the touch screen 30 to display the IMS setting symbol, the first driver selection symbol, and the second driver selection symbol.

Figure 3D:
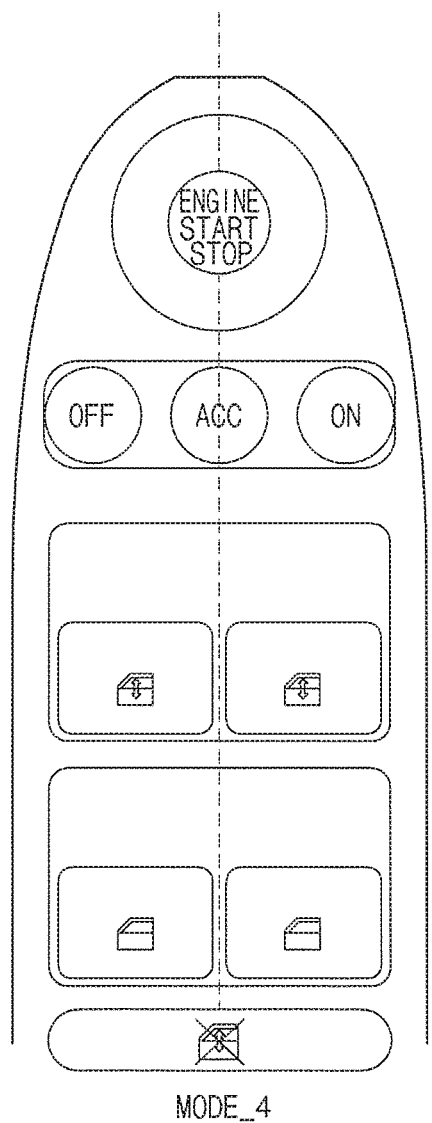

FIG. 3D is a view showing the fourth mode of the integrated switch device for the vehicle according to an exemplary embodiment of the present disclosure. The controller 40 controls the input button 10 to operate as the start button, inactivates the touch button 20, and controls the touch screen 30 to display one of the "OFF" symbol indicating the state in which the power is not supplied to the vehicle's electrical loads, the "ACC" symbol indicating the state in which the power is supplied to some of the vehicle's electrical loads, and the "ON" symbol indicating the state in which the power is supplied to all the vehicle's electrical loads. In this case, when the input button operates as the start button, the controller 40 may display the message "ENGINE START/STOP" on the surface of the input button 10, may display the message "ENGINE START" when the vehicle is not started, may display the message "ENGINE STOP" when the vehicle is started, and may control the touch screen 30 to display the symbols corresponding to the power supply states "OFF", "ACC", and "ON" of the vehicle. In addition, the controller 40 may control the touch screen 30 to display the "ON" symbol in different colors such that the user may distinguish the state in which the power is supplied to all the vehicle's electrical loads while the vehicle is started from the state in which the power is supplied to all the vehicle's electrical loads while the vehicle is not started. In this case, when the touch screen 30 is not a color screen, the power states may be distinguished from each other by using a gray tone.

Figure 3E:
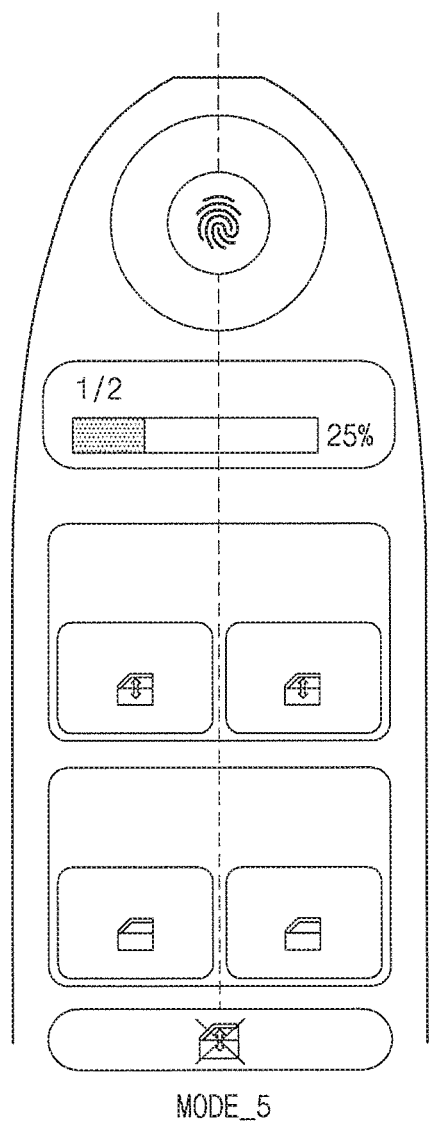

FIG. 3E is a view showing the fifth mode of the integrated switch device for the vehicle according to an exemplary embodiment of the present disclosure. The controller 40 controls the input button 10 to operate in the fingerprint input mode, inactivates the touch button 20, and controls the touch screen 30 to display the fingerprint registration progress in the bar shape and the percent (%).

Figure 4:
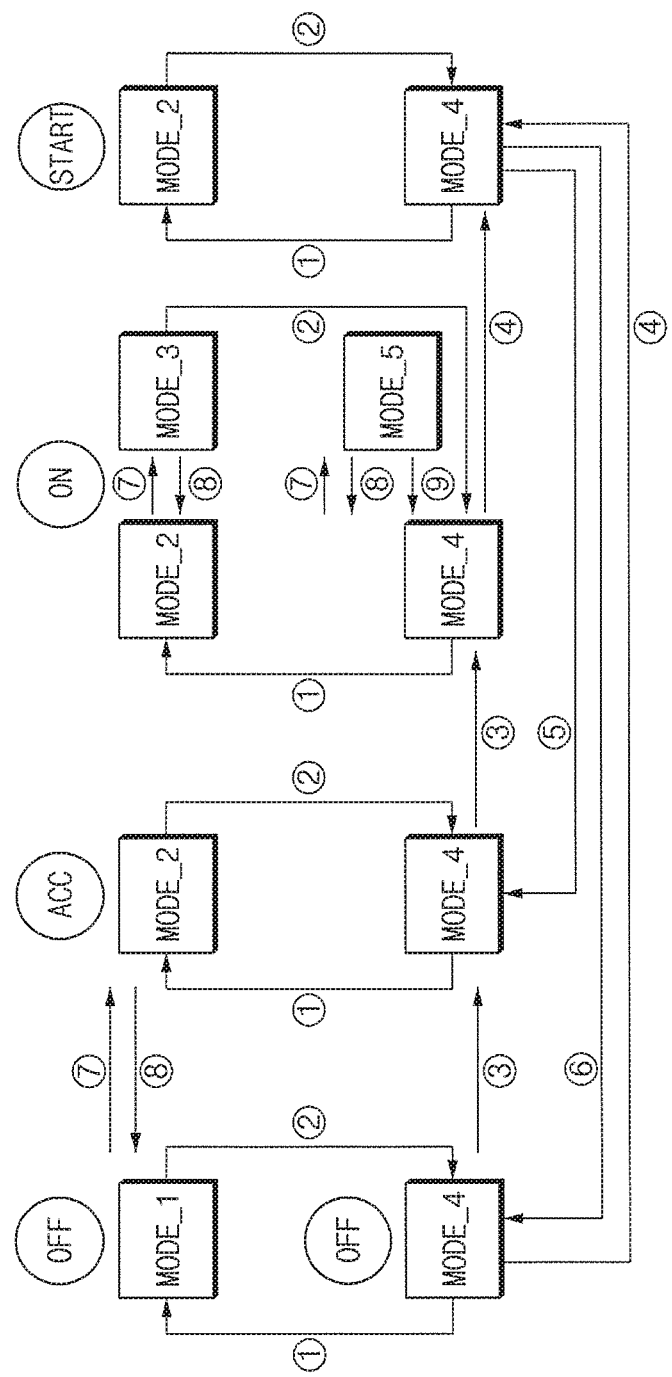
FIG. 4 is a view showing a state transition between operation modes of an integrated switch device for a vehicle according to an exemplary embodiment of the present disclosure.

FIG. 4 is a view showing a state transition between operation modes of an integrated switch device for a vehicle according to an exemplary embodiment of the present disclosure.

In FIG. 4, the "OFF" indicates the state in which the power is not supplied to the vehicle's electrical loads, the "ACC" indicates the state in which the power is supplied to some of the vehicle's electrical loads, the "ON" indicates the state in which the power is supplied to all the vehicle's electrical loads, and the "START" indicates the state in which the vehicle is started.

In FIG. 4, ① denotes that the user swipes the touch screen 30 from a top side to a bottom side while touching the touch screen 30, ② denotes that the user swipes the touch screen from the bottom side to the top side while touching the touch screen 30, ⑦ denotes that the user swipes the touch screen 30 from a right side to a left side while touching the touch screen 30, and ⑧ denotes that the user swipes the touch screen 30 from the left side to the right side while touching the touch screen 30. In this case, ① may include a case in which a reference time elapses, and ② may include a case in which an authentication of the user's fingerprint works normally in MODE_1 of the "OFF" state. As another embodiment, the operation mode may be transited by a driver's gesture recognition method using a motion sensing sensor rather than the swipe method.

In FIG. 4, ③ denotes a case that the input button 10 operated as the start button is pressed once in a state in which a brake pedal of the vehicle is in an off state (the driver does not push the brake pedal), ④ denotes a case that the input button operated as the start button is pressed once in a state in which the brake pedal of the vehicle is in an on state (the driver pushes the brake pedal), ⑤ denotes a case that the input button operated as the start button is pressed once in a state in which a gear of the vehicle is in a parking position P, ⑥ denotes a case that the input button 10 operated as the start button is pressed once in a state in which the gear of the vehicle is in the parking position P, and ⑨ denotes a case that the fingerprint registration is completed.

The above-description is merely an example, and thus, the present disclosure is not limited thereto. The user can also swipe the touch screen 30 from the bottom side to the top side, the top side to the bottom side, from the left side to the right side or the right side to left side in switching one mode to another mode. For example, the controller can switch the first mode to the second mode when a swipe is input in a left to right direction or in a right to left direction, or in a top to bottom direction or bottom to top direction, and switch the second mode to the first mode when a swipe is input in a left to right direction or in a right to left direction, or in a top to bottom direction or bottom to top direction. Similarly, the controller can switch the second mode to the third mode when a swipe is input in a left to right direction or in a right to left direction, or in a top to bottom direction or bottom to top direction, and switch the third mode to the second mode when a swipe is input in a left to right direction or in a right to left direction, or in a top to bottom direction or bottom to top direction. That is, the switch direction is not limited to what is described in FIG. 4, but can be variable in switching from one mode to another mode.

Figure 5A:
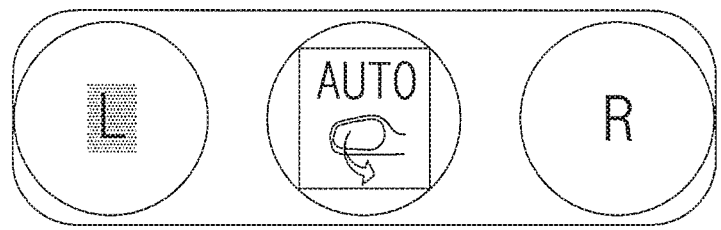
FIGS. 5A and 5B are views showing a display format of a touch screen in an integrated switch device for a vehicle according to an exemplary embodiment of the present disclosure.
Figure 5A:
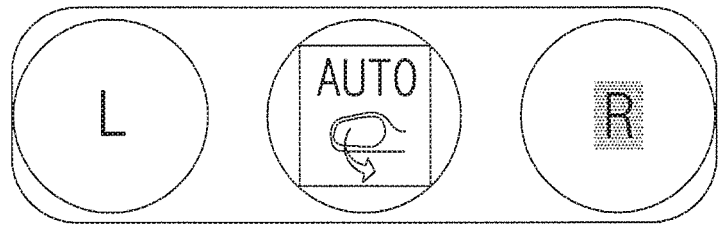
Figure 5B:
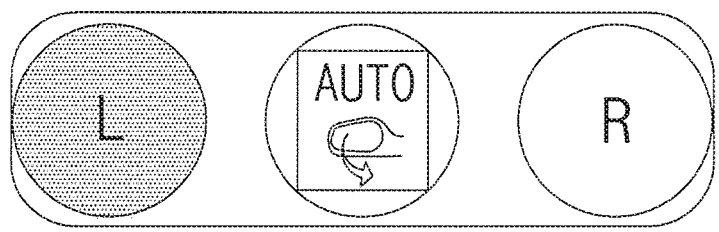
Figure 5B:
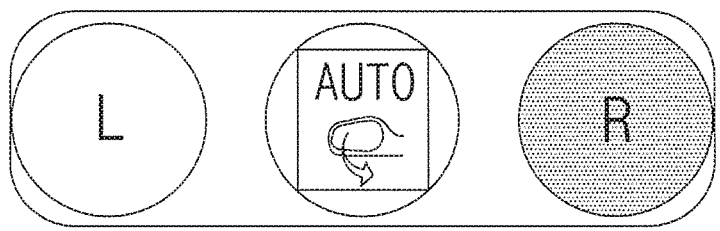

FIGS. 5A and 5B are views showing a display format of the touch screen in the integrated switch device for the vehicle according to an exemplary embodiment of the present disclosure. FIG. 5A shows an example in which a color of a text is changed (e.g., white-> amber) when the left mirror is selected or the right mirror is selected, and FIG. 5B shows an example in which a color of a background is changed (e.g., black-> amber) when the left mirror is selected or the right mirror is selected.

The state of mirror selection may be displayed using the gray tone in addition to the display method using the color.

Figure 6:
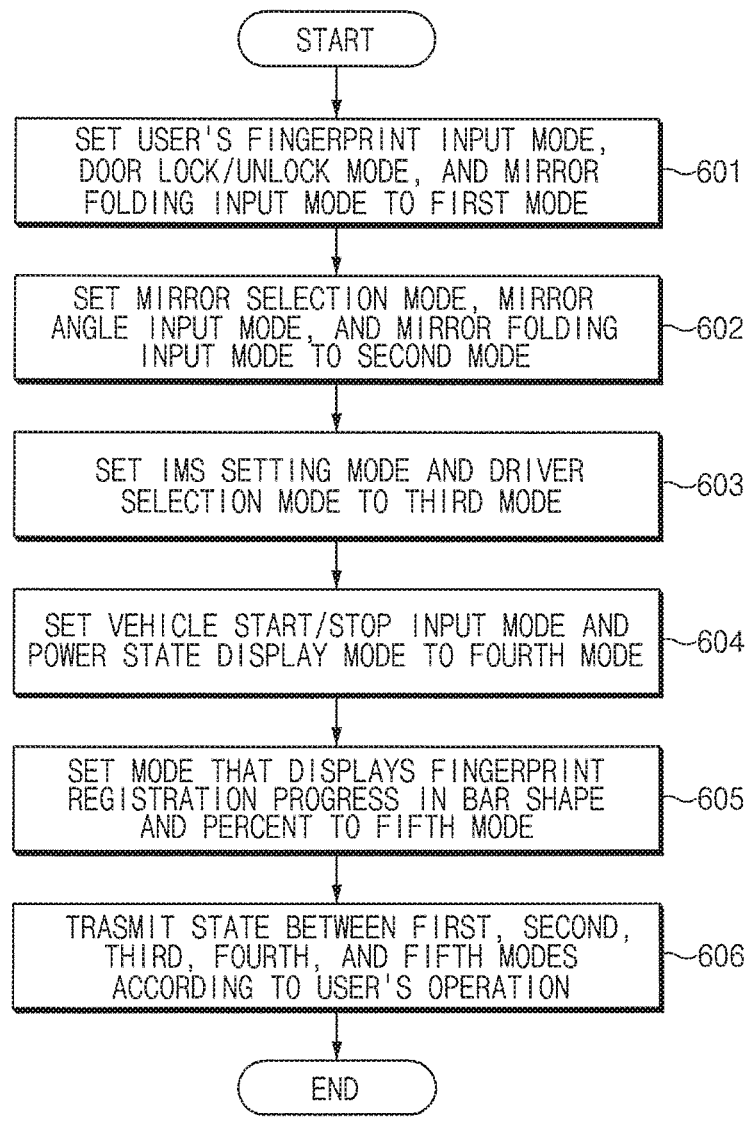
FIG. 6 is a flowchart showing a method for operating an integrated switch device for a vehicle according to an exemplary embodiment of the present disclosure.

FIG. 6 is a flowchart showing a method for operating the integrated switch device for the vehicle according to an exemplary embodiment of the present disclosure.

First, the user's fingerprint input mode, the door lock/unlock input mode, and the mirror folding input mode are set to the first mode (601).

Then, the mirror selection mode, the mirror angle input mode, and the mirror folding input mode are set to the second mode (602).

The IMS setting mode and the driver selection mode are set to the third mode (603).

The engine start/stop input mode and the power state display mode are set to the fourth mode (604).

Then, the mode that displays the fingerprint registration progress in the bar shape and the percent (%) is set to the fifth mode (605).

Next, the state is transited between the first mode, the second mode, the third mode, the fourth mode, and the fifth mode according to the user's operation (606).

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

What is claimed is:

1. An integrated switch device for a vehicle, comprising:
an input device configured to receive a user's fingerprint;
a touch device configured to generate a mirror angle adjustment signal;
a touch display configured to display a door control interface, a mirror selection interface, a mirror control interface, and a seat setting interface; and
a controller configured to:
determine an operation mode based on whether the vehicle is in a driving mode, a power condition, and whether a door is open; and
set an interface displayed on the touch display among the door control interface, the mirror selection interface, the mirror control interface, and the seat setting interface depending on the operation mode,
wherein the controller is further configured to:
activate a user's fingerprint input mode, a door lock/unlock input mode, and a mirror folding input mode as a first mode;
activate a mirror selection mode, a mirror angle input mode, and the mirror folding input mode as a second mode;
switch the first mode to the second mode when a swipe is input in a right to left direction in the first mode; and
switch the second mode to the first mode when the swipe is input in a left to right direction in the second mode.

2. The integrated switch device of claim 1, wherein the input device includes one of a push-return type physical button and a touch button with a vibration reaction.

3. The integrated switch device of claim 1, wherein the controller is further configured to activate an integrated memory system (IMS) setting mode and a driver selection mode as a third mode.

4. The integrated switch device of claim 3, wherein the controller is further configured to:
switch the second mode to the third mode when a swipe is input in a right to left direction in the second mode; and
switch the third mode to the second mode when the swipe is input in a left to right direction in the third mode.

5. The integrated switch device of claim 3, wherein the controller is further configured to:
control the input device such that the input device serves as a start button;
control the touch display such that one of a symbol (OFF) indicating a state in which a power is not supplied to vehicle's electrical loads,
a symbol (ACC) indicating a state in which the power is supplied to some of the vehicle's electrical loads, and a symbol (ON) indicating a state in which the power is supplied to all of the vehicle's electrical loads; and
activate an engine start and stop input mode and a power state display mode as a fourth mode.

6. The integrated switch device of claim 5, wherein the controller is further configured to:
switch the first mode to the fourth mode when a swipe is input in a bottom to top direction in the first mode; and
switch the fourth mode to the first mode when the swipe is input in a top to bottom direction in the fourth mode.

7. The integrated switch device of claim 5, wherein the controller is further configured to:
   switch the first mode to the fourth mode when a fingerprint is authenticated in the first mode; and
   switch the fourth mode to the first mode when the swipe is input in a top to bottom direction in the fourth mode.

8. The integrated switch device of claim 5, wherein the controller is further configured to:
   switch the first mode to the fourth mode when the swipe is input in a bottom to top direction in the first mode; and
   switch the fourth mode to the first mode when a reference time elapses in the fourth mode.

9. The integrated switch device of claim 5, wherein the controller is further configured to:
   switch the first mode to the fourth mode when a fingerprint is authenticated in the first mode; and
   switch the fourth mode to the first mode when a reference time elapses in the fourth mode.

10. The integrated switch device of claim 5, wherein the controller is further configured to:
    switch the second mode to the fourth mode when a swipe is input in a bottom to top direction in the second mode; and
    switch the fourth mode to the second mode when the swipe is input in a top to bottom direction in the fourth mode.

11. The integrated switch device for the vehicle of claim 5, wherein the controller is further configured to:
    switch the second mode to the fourth mode when a swipe is input in a bottom to top direction in the second mode; and
    switch the fourth mode to the second mode when a reference time elapses in the fourth mode.

12. The integrated switch device of claim 5, wherein the controller is further configured to activate a fifth mode in which a fingerprint registration progress is displayed through the touch display in a bar shape and a percent.

13. The integrated switch device of claim 12, wherein the controller is further configured to:
    switch the fourth mode to the fifth mode when a swipe is input in a right to left direction in the fourth mode; and
    switch the fifth mode to the fourth mode when the swipe is input in a left to right direction in the fifth mode.

14. The integrated switch device of claim 12, wherein the controller is further configured to:
    switch the fourth mode to the fifth mode when a swipe is input in a right to left direction in the fourth mode; and
    switch the fifth mode to the fourth mode when a fingerprint registration is completed in the fifth mode.

15. A method for operating an integrated switch device, which comprises an input device, a touch device, a touch display, and a controller, for a vehicle, the method comprising steps of:
    setting, by the controller, a user's fingerprint input mode, a door lock/unlock input mode, and a mirror folding input mode to a first mode;
    setting, by the controller, a mirror selection mode, a mirror angle input mode, and the mirror folding input mode to a second mode;
    setting, by the controller, an integrated memory system (IMS) setting mode and a driver selection mode to a third mode;
    setting, by the controller, an engine start and stop input mode and a power state display mode to a fourth mode;
    setting, by the controller, a mode in which a fingerprint registration progress is displayed in a bar shape and a percent to a fifth mode; and
    transiting, by the controller, a state between the first mode, the second mode, the third mode, the fourth mode, and the fifth mode depending on a user's operation.

16. The method of claim 15, wherein the step of transiting the state comprises:
    switching the first mode to the second mode when a swipe is input in a right to left direction in the first mode;
    switching the second mode to the first mode when the swipe is input in a left to right direction in the second mode;
    switching the second mode to the third mode when the swipe is input in the right to left direction in the second mode;
    switching the third mode to the second mode when the swipe is input in the left to right direction in the third mode;
    switching the third mode to the fourth mode when the swipe is input in a bottom to top direction;
    switching the first mode to the fourth mode when the swipe is input in the bottom to top direction in the first mode;
    switching the fourth mode to the first mode when the swipe is input in a top to bottom direction in the fourth mode;
    switching the second mode to the fourth mode when the swipe is input in the bottom to top direction in the second mode;
    switching the fourth mode to the second mode when a reference time elapses in the fourth mode;
    switching the fourth mode to the fifth mode when the swipe is input in the right to left direction in the fourth mode; and
    switching the fifth mode to the fourth mode when a fingerprint registration is completed in the fifth mode.

17. The method of claim 15, wherein the step of transiting the state comprises:
    switching the first mode to the fourth mode when a fingerprint is authenticated in the first mode; and
    switching the fourth mode to the first mode when a swipe is input in a top to bottom direction in the fourth mode.

18. The method of claim 15, wherein the step of transiting the state comprises:
    switching the first mode to the fourth mode when a swipe is input in a top to bottom direction in the first mode; and
    switching the fourth mode to the first mode when a reference time elapses in the fourth mode.

19. The method of claim 15, wherein the step of transiting the state comprises:
    switching the first mode to the fourth mode when a fingerprint is authenticated in the first mode; and
    switching the fourth mode to the first mode when a reference time elapses in the fourth mode.

* * * * *